(12) United States Patent
Leigh et al.

(10) Patent No.: US 8,127,629 B2
(45) Date of Patent: Mar. 6, 2012

(54) APPARATUS FOR AND METHOD OF ATTACHING A STRAIN SENSING ELEMENT TO A SUBSTRATE

(75) Inventors: Arthur John Leigh, Oxfordshire (GB); Raymond David Lohr, Buckingahmshire (GB)

(73) Assignee: Transense Technologies PLC, Bicester, Oxon (GB)

( * ) Notice: Subject to any disclaimer, the term of this patent is extended or adjusted under 35 U.S.C. 154(b) by 385 days.

(21) Appl. No.: 12/447,004

(22) PCT Filed: Oct. 8, 2007

(86) PCT No.: PCT/GB2007/003817
§ 371 (c)(1),
(2), (4) Date: Apr. 24, 2009

(87) PCT Pub. No.: WO2008/050081
PCT Pub. Date: May 2, 2008

(65) Prior Publication Data
US 2010/0089188 A1    Apr. 15, 2010

(30) Foreign Application Priority Data
Oct. 27, 2006 (GB) .................................. 0621478.7

(51) Int. Cl.
*G01D 21/00* (2006.01)

(52) U.S. Cl. .................................................... 73/866.5
(58) Field of Classification Search ............... 73/866.5, 73/783, 760, 862.391, 862.388
See application file for complete search history.

(56) References Cited

U.S. PATENT DOCUMENTS

| | | | |
|---|---|---|---|
| 3,765,230 A | 10/1973 | Bohm et al. | |
| 3,802,316 A | 4/1974 | Bohm et al. | |
| 5,684,254 A * | 11/1997 | Nakazaki et al. | 73/774 |
| 7,721,610 B2 * | 5/2010 | Ohta et al. | 73/862.338 |

FOREIGN PATENT DOCUMENTS

| | | |
|---|---|---|
| DE | 102006034086 A1 | 1/2008 |
| EP | 0338325 A1 | 10/1989 |
| EP | 0499846 A1 | 8/1992 |
| GB | 1351859 A | 5/1974 |
| GB | 1471543 A | 4/1977 |
| GB | 2062236 A | 5/1981 |

* cited by examiner

*Primary Examiner* — Jewel V Thompson
(74) *Attorney, Agent, or Firm* — Keusey & Associates, P.C.

(57) ABSTRACT

A circular shaft having a platform formed on it by machining a circular flat into the surface of the shaft. A channel extends around the periphery of the circular flat with a depth in the range of 10 to 15% of the diameter of the shaft and in the range of 30 to 50% of the width/diameter of the platform. The width of the platform is 4 to 7% of the diameter of the shaft. A sensor is mounted on the platform, whereby the formation of the platform and surrounding channel reduces the strain arising in the device which is transferred to the sensor.

20 Claims, 3 Drawing Sheets

APPARATUS FOR AND METHOD OF ATTACHING A STRAIN SENSING ELEMENT TO A SUBSTRATE

BACKGROUND OF THE INVENTION

1. Field of the Invention

The present invention relates to improvements in methods and apparatus for attaching strain sensing elements to substrates so as to reduce strain transfer to the sensing elements.

2. The Prior Art

In certain applications, it is desirable to reduce the strain transfer from a substrate such as a shaft to a strain sensing element attached thereto in order to ensure that joint lines of the sensor package housing the sensor element to the substrate are kept within their elastic limit and to ensure that the sensor element operates within its optimum operating range and the like. The prior art approach to achieving such reduction is to increase the size of the substrate, for example the diameter of the shaft to which the sensor is attached. However, this approach has the disadvantage that it necessarily increases material requirements and weight of the substrate and also the space required to accommodate the substrate in operation.

SUMMARY OF THE INVENTION

According to the present invention there is provided a method of attaching a sensor to a device comprising the steps of forming a platform on the device for mounting the sensor on, forming a channel in the surface of the device which extends entirely around the platform, and mounting a sensor on said platform.

The present invention further provides a device having a platform formed thereon, a channel which extends around said platform, and a sensor mounted on said platform.

A method of attaching a sensor to a device, and corresponding device in accordance with the present invention has the advantage that it effectively reduces the strain arising in the device which is transferred to the sensor whilst avoiding the problems associated with the prior art approach.

Preferably, the device is a shaft, and the platform is preferably a flat which is machined into the surface of the shaft, in particular a circular flat. The profile of the channel is preferably, but not limited to, a circular form provided that it advantageously extends in a peripheral path around the platform and is preferably also machined into the shaft. The channel furthermore preferably extends around the periphery of the platform. In particular, the outer dimensions of the flat forming the platform are preferably equal to the inner dimensions of the channel.

Preferably, the depth of the channel from the surface of the device is substantially 10 to 15% of the thickness of the device—in the event of a circular shaft, 10 to 15% of the diameter of the shaft. This has the advantage of ensuring that structural integrity of the shaft is maintained whilst maximising the dilution effect of the channel.

In a further advantageous development, the depth of the channel from the surface of the device is substantially 30 to 50% of the width/diameter of the platform, thereby optimising the dilution effects.

In order to minimise stress concentration effects, the width of the channel is preferably equal to substantially 4 to 7% of the thickness/diameter of the device/shaft.

BRIEF DESCRIPTION OF THE DRAWINGS

In order that the invention may be well understood, there will now be described an embodiment thereof, given by way of example, reference being made to the accompanying drawings, in which.

DETAILED DESCRIPTION OF PREFERRED EMBODIMENT

Figure 1:
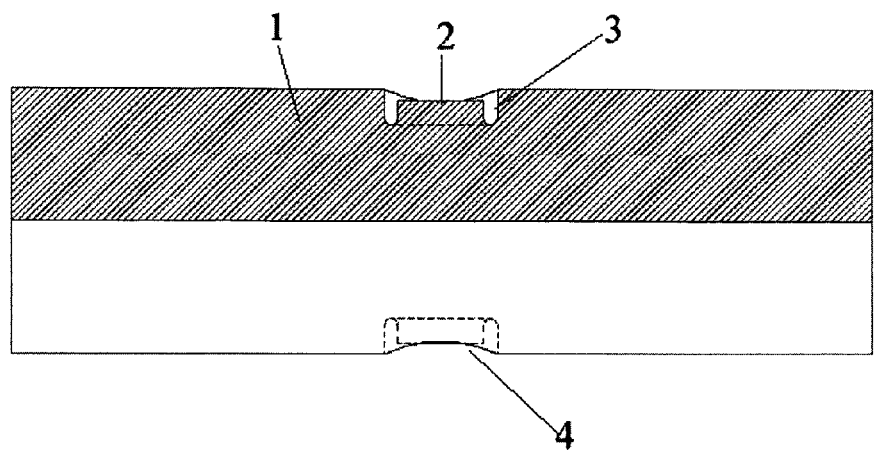
FIG. 1 is a section through a shaft embodying the present invention.
Figure 2:
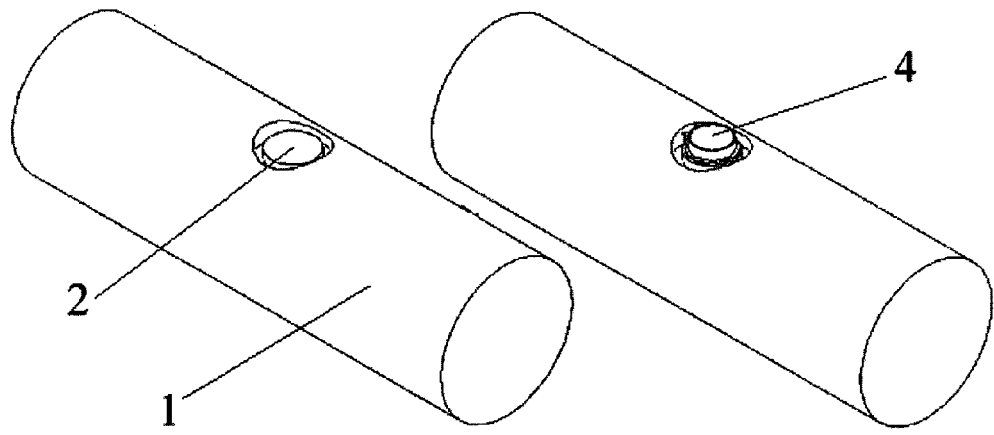
FIG. 2 is a perspective view of the shaft of FIG. 1.
Figure 3:
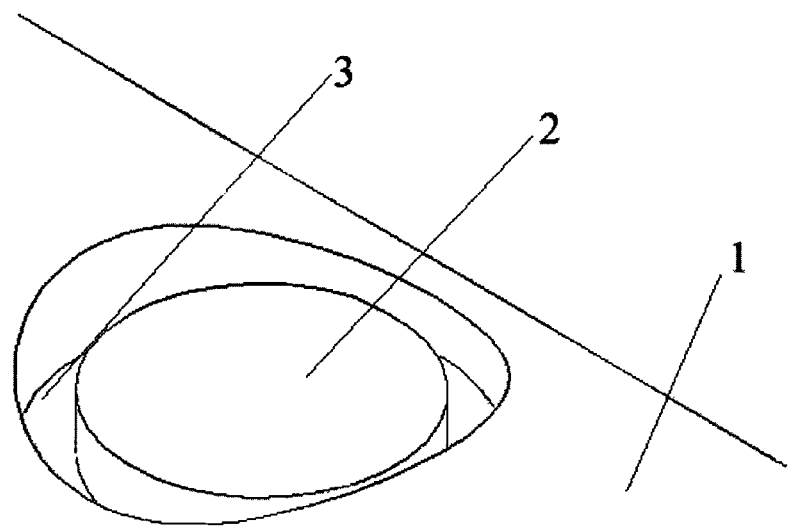
FIG. 3 is a detail enlargement of the perspective view of FIG. 2.

Referring first to FIGS. 1 and 2, there is shown a shaft 1 to which a strain sensor is to be attached in accordance with the invention. To that end, a circular flat 2 is machined into the surface of the shaft as shown more clearly in FIG. 3, slightly recessed into the surface of the shaft so as to provide a platform on which the sensor package 4 can be mounted using any well known method. A channel 3 is then machined into the shaft around the circular flat 2, the channel extending in a circle around the outer periphery of the flat and being deeper than the depth of the surface of the flat below the surface of the shaft 1 as shown in FIG. 1. An optional identical platform and channel arrangement 5 is also shown machined in the shaft diametrically opposite to the first arrangement for mounting a second sensor, by means of which bending effects, which might introduce errors in the strain readings, can be minimised.

The provision of the channel acts to dilute the strain to which the sensor is exposed, by which it is possible to ensure that the sensor is always operating in its optimum range and also ensuring that the means used to attach the sensor to the platform are kept within their elastic limit—thereby preventing the sensor becoming detached. The dilution factor achieved by the present invention can then be used in conjunction with the diluted sensor reading to calculate the actual strain within the shaft.

Figure 4:
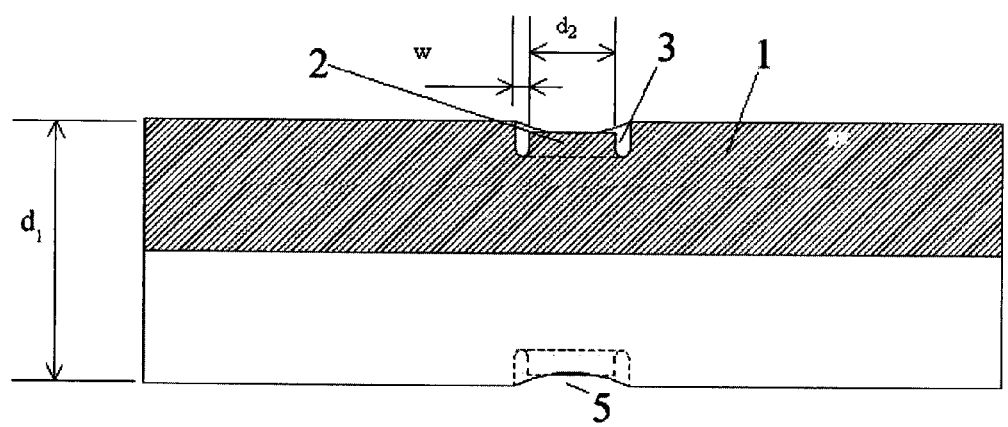
FIG. 4 is detail sectional view of the shaft of FIG. 1.

The depth and width of the channel and the diameter of the platform have an effect on the strain dilution as well as on the structural integrity of the shaft and stress concentration effects. With reference, then, to FIG. 4, it has been found that the following relationships between the relevant dimensions optimise the system:

Structural Consideration for a Circular Shaft
$(h/d_1) \times 100$ = approximately 10-15%
Strain Dilution Consideration
$(h/d_2) \times 100$ = approximately 30-50%
Stress Concentration Consideration
$(w/d_1) \times 100$ = approximately 4-7%

Finite Element Analysis was carried out to demonstrate the advantages of the present invention:

1. Geometry—A simplified shaft was modelled (plain diameter of 37 mm). A 2 mm wide groove with a radiused base was cut into this, leaving a 12 mm diameter upstand. At its deepest point this reaches 13.5 mm from the shaft centreline. The upstand was then spotfaced to a distance of 17 mm from the shaft centreline to provide a flat platform upon which a strain sensor could be bonded.

2. Meshing & Simulation—The model was imported into Strand7 and auto-meshed using quadratic tetrahedral elements at a 1 mm mesh size over the sensor region and 4 mm elsewhere.

The shaft was fully restrained at the left hand end and a torque of 2000 Nm applied to the right hand end by tangential forces on each of the nodes on the outer edge. The localised effects of both the restraint and the applied force were assumed to have no effect at the sensor location and cut-out detail. The material was set as a generic steel with a Young's Modulus of 200 GPa and Poisson's Ratio of 0.25.

Figure 5:
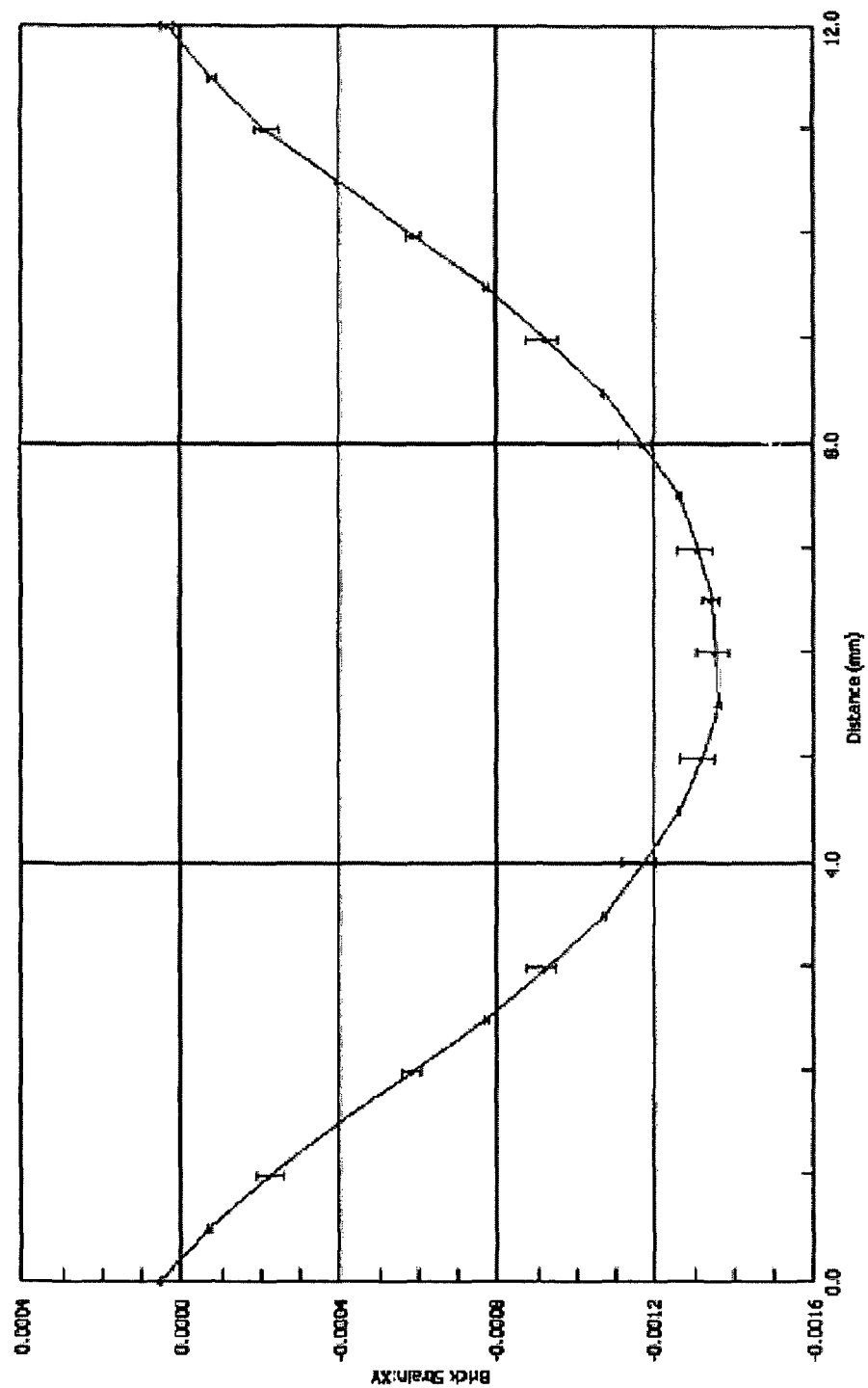
FIG. 5 is a shear strain plot obtained from finite element analysis of the shaft of the invention.

3. Results—The shear strain plot obtained from the simulation is shown in FIG. 5.

Peak shear strain was found to be approximately 1360 microstrain resulting in peak principal strains of circa ±680 microstrain and average principal strains across the platform surface of about half these values. The above results should be compared with the uniform surface principal strains on a plain cylindrical steel shaft, of the same diameter, and similarly torqued, of ±1260 microstrain.

The conclusion is that the channel feature generates a significant strain dilution on the sensor platform surface, approaching a factor of 4, when compared with a plain shaft.

The invention claimed is:

1. A method of attaching a sensor to a device (1) so as to dilute the strain to which the sensor is exposed and hence ensure the sensor is always operating in its optimum range, comprising the steps of
   forming a platform (2) on the device (1) for mounting the sensor on;
   forming a channel (3) in the surface of the device (1) which extends entirely around the platform (2); and
   mounting a sensor on said platform (2).

2. The method according to claim 1, wherein the device is a shaft (1), and the platform (2) comprises a flat machined into the surface of the shaft (1).

3. The method according to claim 2, wherein the depth of the channel (3) from the surface of the device is 10 to 15% of the shaft diameter, and wherein the width of the channel (3) is approximately 4 to 7% of the diameter of the shaft (1) and wherein the channel (3) extends around the periphery of the platform (2), so that the outer dimensions of the flat forming the platform (2) are preferably equal to the inner dimensions of the channel (3).

4. The method according to claim 1, wherein the depth of the channel (3) from the surface of the device (1) is approximately 30 to 50% of the width/diameter of the platform (2).

5. The method according to claim 2, wherein the width of the channel (3) is approximately 4 to 7% of the thickness of the device (1).

6. The method according to claim 1, wherein the platform is a circular flat and the profile of the channel (3) is a circular form which extends in a peripheral path around the platform (2).

7. The method according to claim 1, wherein the depth of the channel (3) from the surface of the device (1) is substantially 10 to 15% of the thickness of the device (1).

8. The method according to claim 1, wherein the channel has a radiused base.

9. The method according to claim 1, wherein said step of forming a platform comprises forming a pair of identical platforms on diametrically opposite sides of the device, and wherein said step of mounting a sensor comprises mounting a sensor on each platform.

10. A method of attaching a sensor to a device (1) so as to dilute the strain to which the sensor is exposed and hence ensure the sensor is always operating in its optimum range, comprising the steps of:
    forming a platform (2) on the device (1) for mounting the sensor on;
    forming a channel (3) in the surface of the device (1) which extends entirely around the platform (2), wherein the channel (3) is machined into the device (1); and
    mounting a sensor on said platform (2).

11. An apparatus comprising:
    a device (1) having a platform (2) formed thereon;
    a channel (3) which extends around said platform (2); and
    a sensor mounted on said platform.

12. The apparatus according to claim 11, wherein the device is a shaft (1), and the platform (2) comprises a flat which is machined into the surface of the shaft (1).

13. The apparatus according claim 12, wherein the depth of the channel (3) from the surface of the device (1) is approximately 10 to 15% of the shaft diameter and wherein the width of the channel (3) is approximately 4 to 7% of the diameter of the shaft (1) and wherein the channel (3) extends around the periphery of the platform (2), so that the outer dimensions of the flat forming the platform (2) are approximately equal to the inner dimensions of the channel (3).

14. The apparatus according to claim 11, wherein the flat is a circular flat and the profile of the channel (3) is a circular form which extends in a peripheral path around the platform (2).

15. The apparatus according to claim 11, wherein the depth of the channel (3) from the surface of the device (1) is approximately 10 to 15% of the thickness of the device (1).

16. The apparatus according to claim 11, wherein the depth of the channel (3) from the surface of the device (1) is approximately 30 to 50% of the width/diameter of the platform (2).

17. The apparatus according to claim 11, wherein the width of the channel (3) is approximately 4 to 7% of the thickness of the device (1).

18. The apparatus according to claim 11, wherein the channel has a radiused base.

19. The apparatus according to claim 11, wherein the device includes a pair of identical platforms formed on diametrically opposite sides of the device, and a sensor mounted each platform.

20. An apparatus comprising:
    a device (1) having a platform (2) formed thereon;
    a channel (3) which extends around said platform (2), wherein the channel (3) is machined into the device (1); and
    a sensor mounted on said platform.

* * * * *